United States Patent
Muramatsu et al.

(10) Patent No.: US 11,008,934 B2
(45) Date of Patent: May 18, 2021

(54) ENGINE CONTROL DEVICE

(71) Applicant: SUBARU CORPORATION, Tokyo (JP)

(72) Inventors: Konosuke Muramatsu, Tokyo (JP); Tomoyuki Kaneda, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/397,642

(22) Filed: Apr. 29, 2019

(65) Prior Publication Data
US 2020/0063650 A1 Feb. 27, 2020

(30) Foreign Application Priority Data

Aug. 24, 2018 (JP) .............................. JP2018-156996

(51) Int. Cl.
*F02B 37/18* (2006.01)
*F02B 37/16* (2006.01)
(Continued)

(52) U.S. Cl.
CPC ............ *F02B 37/186* (2013.01); *F02B 37/16* (2013.01); *F02B 37/24* (2013.01); *F02M 26/50* (2016.02)

(58) Field of Classification Search
CPC ........ F02B 37/16; F02B 37/162; F02B 37/18; F02B 37/183; F02B 37/186; F02D 41/0007; F02D 2200/604; F02D 2200/606
See application file for complete search history.

(56) References Cited

U.S. PATENT DOCUMENTS 5,003,781 A * 4/1991 Shibata .................. F01N 1/166
                                                         181/226
5,005,359 A * 4/1991 Tashima ................ F02B 37/007
                                                          60/600
(Continued)

FOREIGN PATENT DOCUMENTS

JP      S61-016230 A      1/1986
JP      H02-256827 A     10/1990
(Continued)

OTHER PUBLICATIONS

JP-2001280144-A Sugiyama, Tetsuro Pub Oct. 2001 English Translation (Year: 2001).*

(Continued)

*Primary Examiner* — Thomas Sweet
(74) *Attorney, Agent, or Firm* — McGinn IP Law Group, PLLC (57) ABSTRACT

An engine control device controls an engine. The control device includes a controller. The controller is configured to open the air bypass valve of the engine and close the waste gate valve of the engine when a first condition is satisfied, and thereafter determine that an execution condition of a boost pressure increase control is satisfied when a second condition is satisfied. The air-bypass valve disposed on an air-bypass passage that communicates between an upstream side and a downstream side of a compressor in an intake passage. The waste gate valve disposed on a waste gate passage that communicates between an upstream side and a downstream side of the turbine in an exhaust passage. The first condition represents a turbine pre-rotation start request, and the second condition represents a boost pressure increase request.

20 Claims, 7 Drawing Sheets

(51) Int. Cl.
    *F02B 37/24*    (2006.01)
    *F02M 26/50*    (2016.01)

(56) References Cited

U.S. PATENT DOCUMENTS

2014/0328665 A1\* 11/2014 Glugla .................... F02B 37/18
                                                           415/1
2018/0283267 A1\* 10/2018 Xiao ....................... F02B 37/10

FOREIGN PATENT DOCUMENTS

| JP | H05-222946 A | | 8/1993 |
|---|---|---|---|
| JP | H07-034889 A | | 2/1995 |
| JP | 2001280144 A | \* | 10/2001 |
| JP | 2007-071116 A | | 3/2007 |
| JP | 2008-008270 A | | 1/2008 |
| JP | 2014-196678 A | | 10/2014 |
| JP | 2016-098680 A | | 5/2016 |
| JP | 2017-166456 A | | 9/2017 |

OTHER PUBLICATIONS

Japanese Office Action, dated Nov. 27, 2019, in Japanese Application No. 2018-156996 and English Translation thereof.

\* cited by examiner

ENGINE CONTROL DEVICE

The present application claims priority from Japanese Patent Application No. 2018-156996 filed on Aug. 24, 2018, the entire contents of which are hereby incorporated by reference.

BACKGROUND

The disclosure relates to an engine control device for controlling a turbocharged engine.

A turbocharger is a supercharger in which a compressor is driven by a turbine, which is driven by exhaust gas expelled from an engine, to compress combustion air (fresh air or charge).

In the turbocharger, the turbine includes a waste gate valve provided to open and close a passage that is provided in such a manner as to bypasses the turbine with a view to control a boost pressure.

In recent years, electric waste gate valves have widely been used in which the opening of a valve can arbitrarily controlled.

In the turbocharger, the compressor includes an air-bypass valve provided to open and close a passage that is provided in such a manner as to bypass the compressor with a view to suppressing surging resulting from a quick closure of the throttle from a supercharged state.

With such a driving state that may generate surging, air can be recirculated from a downstream side (an engine main body side) to an upstream side (an air cleaner side) of the compressor by opening the air-bypass valve, whereby surging can be suppressed.

As a conventional technique regarding a boost pressure control of a turbocharged engine, for example, Japanese Unexamined Patent Application Publication (JP-A) No. 2016-98680 describes that to suppress a turbo lag, in the case where a waste gate valve is determined to be fully opened, whereas an air-bypass valve is determined not to be fully opened, a great opening is set for an air-bypass valve, and following this, the opening of a waste gate valve is returned to a base value.

Further, JP-A No. 2017-166456 describes that the waste gate valve is set to stay in an intermediate valve position in a non-supercharged state, and feedback control is performed to make an intake pipe pressure to approach a target intake pipe pressure. In this manner, the driving work of a turbine is reduced with a comparison of a case where a waste gate valve is normally closed, which turns out causing a compressor to have some degree of pre-rotation, whereby the occurrence of a turbo lag is suppressed to improve the drivability.

In the description of JP-A No. 2014-196678, a period for the air-bypass valve being opened is made as short as possible, although an air-bypass valve is opened when a target throttle passing air amount becomes a surge generation upper limit flow rate or less. This is because opening the air-bypass valve is effective in preventing the occurrence of a surge but may cause a problem in that a turbo lag is generated during reacceleration due to a reduction in boost pressure.

SUMMARY

An aspect of the disclosure provides an engine control device for controlling an engine. The control device includes a controller. The controller is configured to open the air bypass valve of the engine and close the waste gate valve of the engine when a first condition is satisfied, then determine that an execution condition of a boost pressure increase control is satisfied when a second condition is satisfied. The engine includes a turbocharger, an air-bypass passage, an air-bypass valve, a waste gate passage, a waste gate valve, and a throttle. The turbocharger includes a turbine configured to be driven by exhaust gas and a compressor configured to be driven by the turbine to compress fresh air. The air-bypass passage communicates between an upstream side and a downstream side of the compressor in an intake passage. The air-bypass valve is disposed on the air-bypass passage. The waste gate passage communicates between an upstream side and a downstream side of the turbine in an exhaust passage. The waste gate valve is disposed on the waste gate passage. The throttle is disposed downstream of the compressor in the intake air passage. The first condition represents a turbine pre-rotation start request, and the second condition represents a boost pressure increase request.

An aspect of the disclosure provides an engine control device for controlling an engine. The control device includes circuitry. The circuitry is configured to open the air bypass valve of the engine and close the waste gate valve of the engine when a first condition is satisfied, then determine that an execution condition of a boost pressure increase control is satisfied when a second condition is satisfied. The engine includes a turbocharger, an air-bypass passage, an air-bypass valve, a waste gate passage, a waste gate valve, and a throttle. The turbocharger includes a turbine configured to be driven by exhaust gas and a compressor configured to be driven by the turbine to compress fresh air. The air-bypass passage communicates between an upstream side and a downstream side of the compressor in an intake passage. The air-bypass valve is disposed on the air-bypass passage. The waste gate passage communicates between an upstream side and a downstream side of the turbine in an exhaust passage. The waste gate valve is disposed on the waste gate passage. The throttle is disposed downstream of the compressor in the intake air passage. The first condition represents a turbine pre-rotation start request, and the second condition represents a boost pressure increase request.

DETAILED DESCRIPTION

Due to its working principle, a turbocharged engine inherently involves a response time delay (a turbo lag) in which a certain length of time is taken from a point in time at which the opening of the throttle is increased until the boost pressure and the output torque are increased accordingly during an acceleration (an increase in load) from a region where no supercharging is performed (NA region).

In recent turbocharged engines, the turbo lag has been suppressed by adopting turbines and compressors of reduced diameters (A/R rations), executing precise controls and the like.

However, some drivers take a characteristic favorable in which such a boost pressure increases with a certain response time delay after a start of acceleration of a vehicle and the vehicle is accelerated violently during the acceleration (the characteristic being referred to as a turbo bang) since they can enjoy feeling sporty and exhilarate while being backed up by a sensation of extended acceleration.

Due to this, even with the recent turbocharged engines in which the suppression of turbo lag is taken into consideration, in the event that the turbocharged engines can be tuned so as to obtain a boost pressure rising characteristic like the one of an engine with a relatively large turbo lag, it is considered that the product value of a vehicle equipped with such an engine can be improved by enhancing the satisfaction of the user by imparting an acceleration feeling that the user favors.

In addition, increasing the output torque by increasing the boost pressure from an initial stage of acceleration for accelerating a vehicle on a low μ road or for quick starting or acceleration of a vehicle during a sporty driving as in a competition may result in easy generation of wheel spins. In such a case, by adopting a characteristic in which the boost pressure and acceleration are increased after a start of acceleration, a function like a traction control is exhibited, resulting from time to time in improvement in drivability (easy driving) and acceleration performance.

It is desired to provide an engine control device that can obtain a characteristic where acceleration is increased as start of acceleration.

First Embodiment

Hereinafter, a first embodiment of an engine control device to which the disclosure is applied will be described.

The engine control device of the first embodiment is provided on a turbocharged gasoline engine that is mounted on, for example, a motor vehicle such as a passenger vehicle as a traveling power source.

Figure 1:
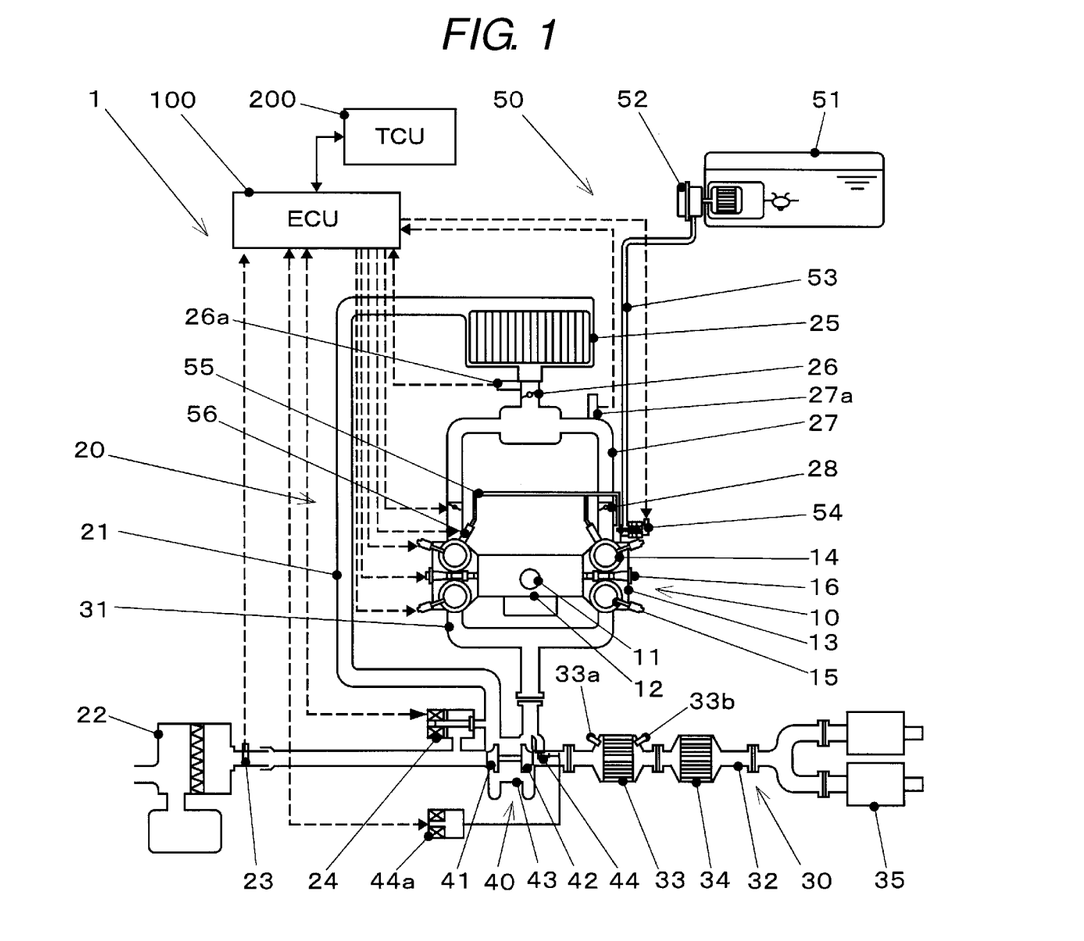
FIG. 1 is a diagram schematically illustrating the configuration of an engine including a first embodiment of an engine control device to which the disclosure is applied.

FIG. 1 is a diagram schematically illustrating the configuration of an engine including the engine control device of the first embodiment.

As illustrated in FIG. 1, the engine 1 includes a main body unit 10, an intake system 20, an exhaust system 30, a turbocharger 40, a fuel supply system 50, an engine control unit (ECU) 100, and the like.

The main body unit 10 constitutes a main mechanical unit of the engine 1, which is, for example, a horizontally-opposed four-cylinder, four-stroke, DOHC, direct injection gasoline engine.

The main body unit 10 includes a crankshaft 11, a cylinder block 12, cylinder heads 13, intake valve systems 14, exhaust valve systems 15, ignition plugs 16, and the like.

The crankshaft 11 constitutes an output shaft of the engine 1, and respective pistons of the four cylinders, not shown, is each coupled to the crankshaft 11 via the corresponding connecting rod (i.e. conn-rod).

The cylinder block 12 is a block-like member including the four cylinders and is divided transversely into two half blocks with the crankshaft 11 held between them.

A first cylinder and a third cylinder, which are provided sequentially in that order from a front side of the vehicle, are provided in the right-hand side half block (when left and right are referred to herein, they denote left and right of a vehicle body with the engine 1 mounted longitudinally on the vehicle) of the cylinder block 12, and a second cylinder and a fourth cylinder are provided in the left-hand side half block of the cylinder block 12.

A crankcase member where to accommodate the crankshaft 11 is provided at a joint portion between the left-hand side and right-hand side half blocks of the cylinder block 12.

The crankshaft 11 is supported rotatably by a main bearing provided in the cylinder block 12.

A crank angle sensor, not illustrated, is provided on the cylinder block 12 to detect an angular position of the crankshaft 11.

The crank angle sensor outputs a pulse-like crank angle signal in response to a rotation of the crankshaft 11 and transmits the signal to the ECU 100.

The ECU 100 calculates a rotation speed of the crankshaft (an engine speed Ne) based on the output from the crank angle sensor.

The cylinder heads 13 are individually provided at a left and right end portions of the cylinder block 12.

The cylinder heads 13 each include combustion chambers, not shown, intake ports, exhaust ports, as well as the intake valve systems 14, exhaust valve systems 15, and the like.

The combustion chambers are each made up of a recess provided to face a crown surface of the piston, not shown, and constitutes part of a space area where an air-fuel mixture is burned when the air-fuel mixture is compressed by the piston.

The intake ports each constitute a passage through which combustion air (fresh air or charge) is introduced into the combustion chamber.

The exhaust ports each constitute a passage through which burnt gas (exhaust gas) is discharged out of the combustion chamber.

An intake valve and an exhaust valve open and close the intake port and the exhaust port, respectively, at predetermined valve timings.

The intake valve system 14 includes the intake valve and a drive system for the intake valve.

The exhaust valve system 15 includes the exhaust valve and a drive system for the exhaust valve.

The drive systems of the individual valves each include a cam sprocket driven by a crank sprocket provided at an end portion of, for example, the crankshaft 11 via a timing chain, not illustrated, a camshaft driven by the cam sprocket, and the like.

In addition, the intake valve system 14 and the exhaust valve system 15 each include a valve timing variable mechanism configured to cause the cam sprocket and the camshaft to rotate relative to each other about a rotation center axis by means of a hydraulic actuator.

The ignition plugs 16 each generates an electric spark inside the combustion chamber in response to an ignition signal from the ECU 100 to ignite an air-fuel mixture.

The intake system 20 takes in outside air and introduces the outside air into the intake ports in the cylinder heads 13 as combustion air.

The intake system 20 includes an intake duct 21, an air cleaner 22, an airflow meter 23, an air-bypass valve 24, an intercooler 25, a throttle valve 26, an intake manifold 27, a tumble generation valve 28, and the like.

The intake duct 21 is a pipe line through which combustion air taken in from the outside is carried.

A compressor 41 of a turbocharger 40 is provided at an intermediate portion of the intake duct 21, as will be described later.

The air cleaner 22 is provided near an inlet to the intake duct 21 and includes an air cleaner element configured to filter out foreign matters like dust and an air cleaner case that accommodates the air cleaner element therein.

The airflow meter 23 is provided at an outlet portion of the air cleaner 22 and constitutes a sensor configured to measure a flow rate of air passing therethrough.

An output from the airflow meter 23 is transmitted to the ECU 100 for use for controlling a fuel injection amount or the like and calculating an estimated surging amplitude.

The air-bypass valve (ABV) 24 is provided on a bypass passage through which part of air flowing inside the intake duct 21 is recirculated from a downstream side to an upstream side of the compressor 41 and opens and closes the bypass passage.

The air-bypass valve 24 is switched between an opened state and a closed state by an electric actuator such as a solenoid in response to a command from the ECU 100.

The intercooler 25 cools air compressed at the compressor 41 through thermal exchange between the compressed air and, for example, running air (a flow of air against a vehicle body generated as a result of running of the vehicle).

The throttle valve 26 controls an intake air amount to control the output of the engine 1.

For example, a butterfly valve provided inside the intake passage can be used as the throttle valve 26.

The throttle valve 26 is driven to be opened and closed by an electric actuator so that an actual opening reaches a target opening set by the ECU 100 based on a driver's request torque.

Normally, the target opening of the throttle valve 26 increases as an operation amount (a depressing amount) of an accelerator pedal by the driver increases.

The throttle valve 26 is disposed adjacent to an outlet from the intercooler 25.

A pressure sensor 26a is provided at an inlet side (an upstream side) of the throttle valve 26 to detect an intake pipe pressure.

An output from the pressure sensor 26a is transmitted to the ECU 100.

The intake manifold 27 is a branch pipe configured to distribute air emerging from the throttle valve 26 into the intake ports of the individual cylinders.

A pressure sensor 27a is provided on the intake manifold 27 to detect an intake pipe pressure downstream of the throttle valve 26.

An output from the pressure sensor 27a is transmitted to the ECU 100.

The tumble generation valve 28 is provided within the passage of the intake manifold 27 and controls states of tumble flows formed within the cylinders by switching states of an air passage extending from the intake manifold 27 to reach the intake ports.

The tumble generation valve 28 switches the states in response to a command from the ECU 100.

The exhaust system 30 discharges burnt gas (exhaust gas) from the exhaust ports of the cylinder heads 13.

The exhaust system 30 includes an exhaust manifold 31, an exhaust pipe 32, a front catalytic converter 33, a rear catalytic converter 34, silencers 35, and the like.

The exhaust manifold 31 is a pipe line (an exhaust passage) that collects exhaust gas emerging from the respective exhaust ports of the cylinders for introduction into a turbine 42 of the turbocharger 40.

The exhaust pipe 32 is a pipe line (an exhaust passage) that discharges exhaust gas emerging from the turbine 42 of the turbocharger 40 to the outside.

The front catalytic converter 33 and the rear catalytic converter 34 are provided sequentially in that order as viewed from turbine 42 halfway along the exhaust manifold 31.

The front catalytic converter 33 and the rear catalytic converter 34 are each made up of a three-way catalytic converter in which a noble metal such as platinum, rhodium, or palladium is supported on a carrier of, for example, alumina and remove or reduces HC, CO, and NOx.

A front A/F sensor 33a and a rear A/F sensor 33b are provided at an inlet to and an outlet from the front catalytic converter 33, respectively, to detect an air-fuel ratio (A/F) based on the properties of exhaust gas.

Outputs from the front A/F sensor 33a and the rear A/F sensor 33b are transmitted to the ECU 100 for use for an air-fuel ratio feedback control of a fuel injection amount, a degradation diagnosis of the front catalytic converter 33, and the like.

The silencers 35 are disposed adjacent to an outlet portion of the exhaust pipe 32 and reduce the sound energy of exhaust gas to thereby suppress exhaust noise.

The exhaust pipe 32 is branched into, for instance, two pipes near the outlet portion, and the silencers 35 are provided at portions of the branched pipes that lie further downstream than the branched portion.

The turbocharger 40 is an exhaust gas turbine supercharger configured to compress fresh air or charge by making use of the energy of exhaust gas.

The turbocharger 40 includes the compressor 41, the turbine 42, a bearing housing 43, a waste gate valve (WGV) 44, and the like.

The compressor 41 is a centrifugal compressor configured to compress combustion air.

The turbine 42 drives the compressor 41 by making use of the energy of exhaust gas.

A compressor wheel of the compressor 41 and a turbine wheel of the turbine 42 are disposed coaxially and are directly coupled together by a shaft.

The bearing housing 43 is provided between the compressor 41 and the turbine 42.

The bearing housing 43 couples housings of the compressor 41 and the turbine 42 together and includes a bearing rotatably supporting a shaft coupling the compressor wheel and the turbine wheel together and a lubricating device.

The waste gate valve 44 is provided on a waste gate passage that bypasses part of exhaust gas from an inlet side to an outlet side of the turbine 42 and opens and closes the waste gate passage.

The waste gate valve 44 includes an electric actuator 44a configured to drive to open and close the waste gate valve 44 and an opening or valve position sensor, not illustrated, that detects an opening or valve position of the waste gate valve 44, and its valve position or opening is controlled by the ECU 100.

The furl supply system 50 supplies fuel to the individual cylinders of the engine 1.

The fuel supply system 50 includes a fuel tank 51, a feed pump 52, a feed line 53, a high-pressure pump 54, a high-pressure fuel line 55, injectors 56, and the like.

The fuel tank 51 is a container where gasoline as fuel is stored.

Feed pump 52 is a low-pressure fuel pump configured to discharge fuel inside the fuel tank 51 to send it to the high-pressure pump 54.

The feed line 53 is a fuel passage (a low-pressure fuel line) configured to send fuel discharged by the feed pump 52 to the high-pressure pump 54.

The high-pressure pump 54 is attached to the cylinder head 13 and is driven via a camshaft to increase a fuel pressure to a predetermined fuel pressure for injection.

The high-pressure pump 54 includes a plunger configured to reciprocate inside a cylinder in association with the rotation of the camshaft to pressurize fuel and an electromagnetic metering valve and can control a fuel pressure inside the high-pressure fuel line 55 by controlling a duty ratio of the electromagnetic metering valve by the ECU 100.

The high-pressure fuel line 55 constitutes a fuel passage that delivers the fuel whose pressure is raised by the high-pressure pump 54 to the injectors 56 provided for the individual cylinders.

The injectors 56 constitute injection valves configured to inject the fuel supplied from the high-pressure fuel line 55 directly into corresponding combustion chambers of the individual cylinders (direct injection) in response to an injection signal from the ECU 100.

The engine control unit (ECU) 100 supervises the control of the engine 1 and its auxiliaries.

The ECU 100 includes, for instance, an information processing device such as a CPU or the like, storage units such as RAM and ROM, an input/output interface a bus connecting these constituent members, and the like.

Outputs from various sensors provided on the engine 1 are transferred to the ECU 100, and the ECU 100 can output control signals to control target members provided on the engine 1 such as individual actuators, valves, ignition plugs, injectors and the like.

The ECU 100 calculates a driver's request torque based on an operation amount (a depression amount) of an accelerator pedal, not illustrated and controls an output (torque) of the engine 1 by controlling the opening of the throttle valve 26, valve timing, boost pressure, ignition timing, fuel injection amount and fuel injection timing so that a torque that the engine 1 generates actually (an actual torque) approaches the driver's request torque.

Additionally, the ECU 100 functions as an air-bypass valve control unit that switches the air-bypass valve 24 between the opened state and the closed state to suppress surging generated inside the intake pipe when the throttle valve 26 is closed rapidly or the like.

The ECU 100 also functions as a waste gate valve control unit that controls the opening of the electric waste gate valve 44 not only to control the boost pressure in the supercharging region but also to make compatible fuel consumption and drivability in the non-supercharging region (the NA region) where no supercharging is performed.

The ECU 100 can communicate with a transmission control unit (TCU) 200 via an onboard LAN such as a CAN communication system, for example, or the like.

The TCU 200 supervises the control of a transmission that changes a rotational output speed of the engine 1 for output to a power transmission mechanism such as a drive shaft or the like and its auxiliaries.

As an example, the transmission can constitute a chain CVT including a variator (a transmission mechanism unit) formed by spanning a chain between a pair of pulleys that can change an effective diameter.

The transmission includes a forward and reverse motion switching mechanism, a torque converter, a lock-up clutch, a parking lock mechanism, and the like.

The forward and reverse motion switching mechanism can reverse a rotational output between a D (forward) range and an R (reverse) range and select an N (neutral) range where no power is transmitted.

The torque converter is a fluid coupling that is used as a starting device for starting the vehicle from a standstill state.

The lock-up clutch restrains a relative rotation between an input side and output side of the torque converter when a predetermined lockup condition is satisfied to improve the transmission efficiency to thereby provide a directly coupled state.

The parking lock mechanism fixes (locks up) the rotation of an output shaft of the transmission to prevent the vehicle from starting to move when a P (parking) range is selected.

In the P range, similar to the N range, no power is transmitted from the engine to drive wheels.

The TCU 200 transmits information on the currently selected range in the transmission to the ECU 100.

Figure 2:
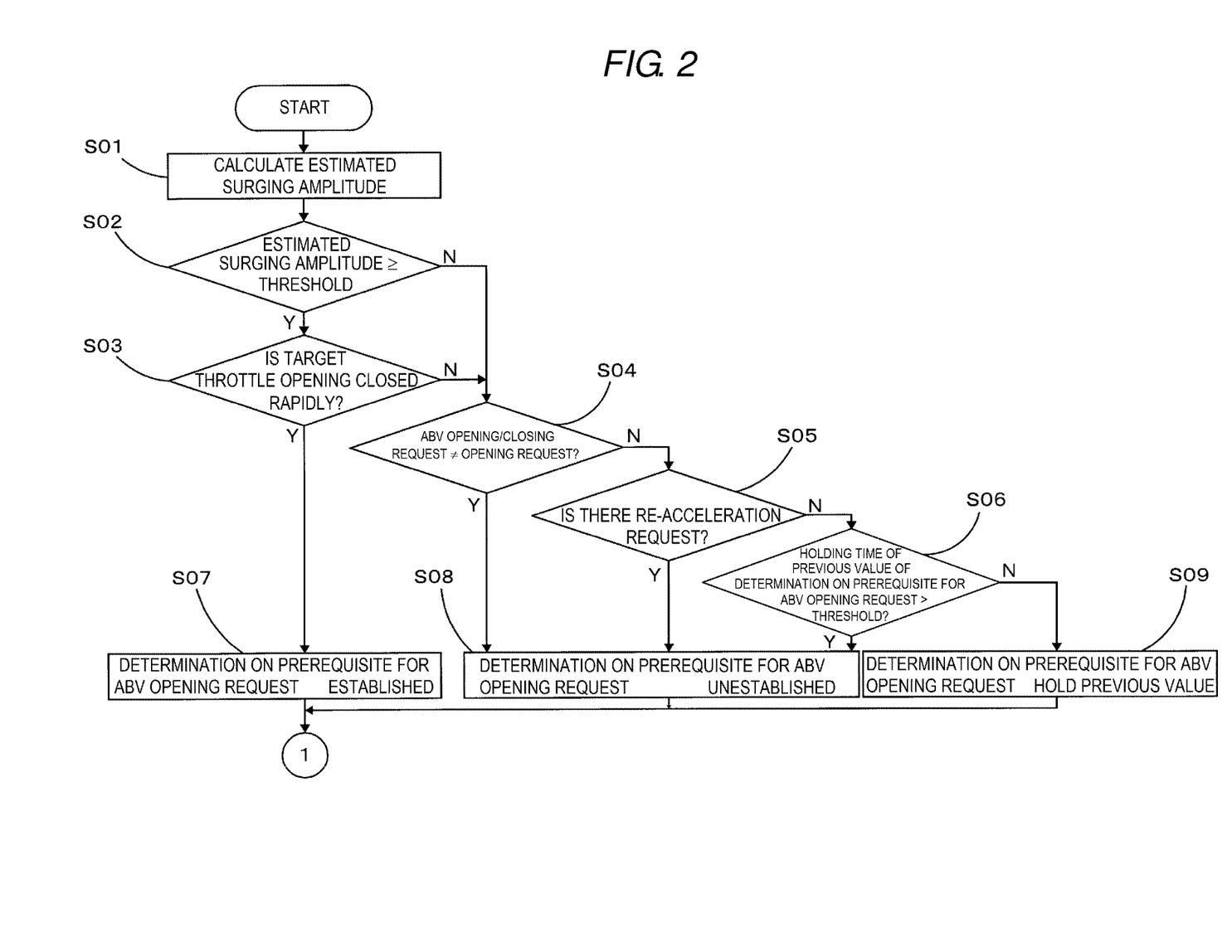
FIG. 2 is a diagram of a first part of a flowchart illustrating a surging suppression control in the engine control device of the first embodiment.
Figure 3:
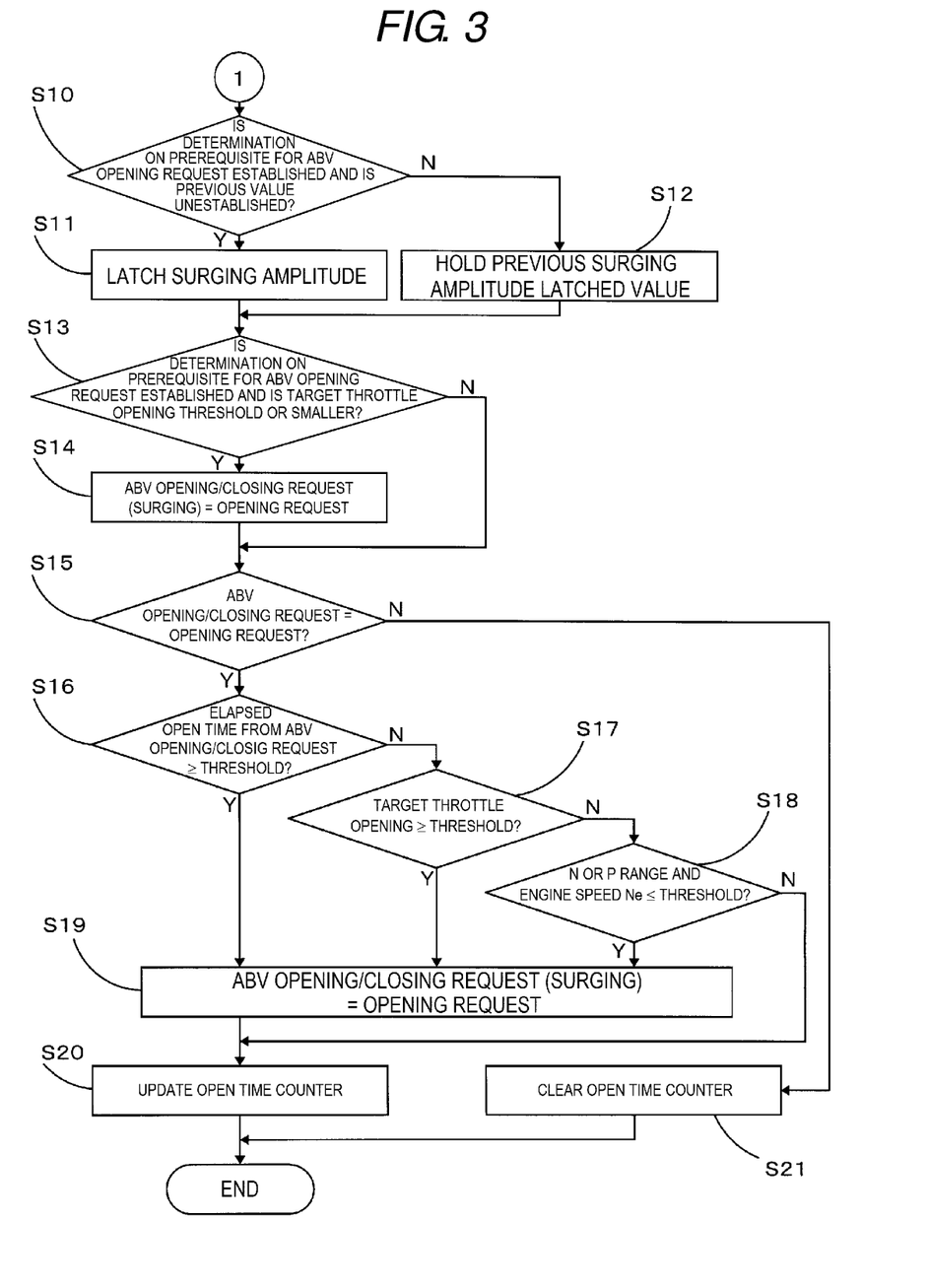
FIG. 3 is a diagram of a second part of the flowchart illustrating the surging suppression control in the engine control device of the first embodiment.

FIGS. 2, 3 are diagrams of a first part and a second part of a flowchart illustrating a surging suppression control in the engine control device of the first embodiment.

Hereinafter, the surging suppression control will be described sequentially step by step.

<Step S01: Calculation of Estimated Surging Amplitude>

The ECU 100 calculates an estimated amplitude (an estimated surging amplitude) of surging (periodic vibrations and resonances of air generated within the intake system 20 between the compressor 41 and the throttle valve 26) that could be generated when the throttle valve 26 is closed rapidly from the current driving state of the engine 1.

The estimated surging amplitude can be calculated based on, for example, an intake air amount that is detected by the airflow meter 23 and an engine speed Ne that is calculated based on an output of the crank angle sensor.

Thereafter, the surging suppression control proceeds to step S02.

<Step S02: Determination on Estimated Surging Amplitude>

The ECU 100 compares the estimated surging amplitude calculated in step S01 with a preset threshold.

The threshold is set by taking into consideration a surging amplitude that can generate a sound pressure at which a passenger of the vehicle is caused to feel that a surging sound generated annoys him or her in the passenger compartment of the vehicle.

If the estimated surging amplitude is equal to or greater than the threshold, the surging suppression control proceeds to Step S03, whereas if the estimated surging amplitude is smaller than the threshold, the control proceeds to Step S04.

<Step S03: Throttle Quick Closure Determination>

The ECU 100 determines whether the target opening of the throttle valve 26 is closed rapidly.

For example, it can be determined that the throttle valve 26 is closed rapidly when the target opening of the throttle valve 26 is reduced by a predetermined opening difference or greater at a predetermined rate of change (speed) or greater.

If the target opening of the throttle valve 26 is closed rapidly, the surging suppression control proceeds to Step S07, otherwise, the control proceeds to step S04.

<Step S04: Determination on Air Bypass Valve Opening/Closing Request>

The ECU 100 determines whether an air-bypass valve opening/closing request set in Steps S14, S19, which will be described later, is an opening request.

If the air-bypass valve opening/closing request is not an opening request, the surging suppression control proceeds to Step S08, otherwise, the control proceeds to Step S05.

<Step S05: Determination on Re-Acceleration Request>

The ECU 100 determines whether the driver makes a re-acceleration request by operating the accelerator pedal or the like.

For example, when at least either of the driver's request torque and the target opening of the throttle valve 26 is once reduced and then is increased again, it can be determined that the driver makes a re-acceleration request.

If the ECU 100 determines that the driver makes a re-acceleration request, the surging suppression control proceeds to Step S08, otherwise, the control proceeds to Step S06.

<Step S06: Determination on Holding Time of Previous Value for Determination on Prerequisite for Air Bypass Valve Opening Request>

The ECU 100 compares the holding time of the previous value for the determination on the prerequisite for an air-bypass valve opening request that is set in Steps S07, S08 with a preset threshold.

If the holding time is the threshold or greater, the surging suppression control proceeds to Step S08, otherwise, the control proceeds to Step S09.

<Step S07: Establishment of Determination on Prerequisite for Air Bypass Valve Opening Request>

The ECU 100 establishes a determination on a prerequisite for an air-bypass valve opening request that constitutes a prerequisite for execution of a control to open the air-bypass valve 24 for surging suppression.

Then, the surging suppression control proceeds to Step S10 (refer to FIG. 3 illustrating the second part of the flowchart).

<Step S08: Unestablished Determination on Prerequisite for Air Bypass Valve Opening Request>

The ECU 100 determines that the prerequisite for an air-bypass valve opening request is unestablished.

Thereafter, the surging suppression control proceeds to Step S10.

<Step S09: Holding of Previous Value for Prerequisite for Air Bypass Valve Opening Request>

The ECU 100 holds the results of the previous determination (the previous value) as the results of the determination on the prerequisite for an air-bypass valve opening request.

Thereafter, the surging suppression control proceeds to Step S10.

<Step S10: Determination on Current Value and Previous Value for Prerequisite for Air Bypass Valve Opening Request>

The ECU 100 refers to the current value and the previous value for determination on the prerequisite for an air-bypass valve opening request.

If the current value for the determination on the prerequisite for an air-bypass valve opening request is established and the previous value for the determination on the prerequisite for an air-bypass valve opening request is unestablished, the surging suppression control proceeds to Step S11, otherwise, the control proceeds to Step S12.

<Step S11: Latching of Surging Amplitude>

The ECU 100 latches (holds) the value of the estimated surging amplitude calculated last in Step S01 as a surging amplitude latch value.

Thereafter, the surging suppression control proceeds to Step S13.

<Step S12: Holding of Previous Surging Amplitude Latched Value>

The ECU 100 holds the surging amplitude latch value that has been latched heretofore (that is latched in Step S11 immediately before).

Thereafter, the surging suppression control proceeds to Step S13.

<Step S13: Determination on Prerequisite for Air Bypass Valve Opening Request and Determination on Target Throttle Opening>

The ECU 100 refers to the current value for determination on the prerequisite for an air-bypass valve opening request and the target opening of the throttle valve 26.

If the prerequisite for an air-bypass valve opening request is established and the target opening of the throttle valve 26 is the preset threshold or smaller, the surging suppression control proceeds to Step S14, otherwise the control proceeds to Step S15.

<Step S14: Air Bypass Valve Opening/Closing Request (Surging)=Opening>

The ECU 100 sets the air-bypass valve opening/closing request for suppressing surging to an "opening" request.

As a result, the air bypass valve 24 is brought into an opened state.

Thereafter, the surging suppression control proceeds to Step S15.

<Step S15: Determination on Air Bypass Valve Opening/Closing Request>

The ECU 100 refers to the current state of the air-bypass valve opening/closing request.

If the air-bypass valve opening/closing request is "opening", the surging suppression control proceeds to Step s16, otherwise, the control proceeds to Step S21.

<Step S16: Determination on Elapsing Time for Opening in Air-Bypass Valve Opening/Closing Request>

The ECU 100 refers to a counter value (a time that has elapsed since the air-bypass valve opening/closing request is set to "Opening") of an air-bypass valve opening time counter that is a counting device for measuring a time when the air-bypass valve 24 stays continuously in the opened state.

If the elapsing time is a preset threshold or greater, the surging suppression control proceeds to Step S19, otherwise, the control proceeds to Step S17.

<Step S17: Determination on Target Throttle Opening>

The ECU 100 compares the target opening of the throttle valve 26 with a preset threshold.

This threshold value is set in consideration of an opening of the throttle valve 26 at which even though surging is generated by a rapid closure of the throttle valve 26, the surging generated is eliminated to such an extent that the passenger feels that the surging is not annoying in the passenger compartment of the vehicle by the subsequent increase in the opening of the throttle valve 26.

If the target opening of the throttle valve 26 is the threshold or greater, the surging suppression control proceeds to Step S19, otherwise, the control proceeds to Step S18.

<Step S18: Determination on State of Transmission and Engine Speed>

The ECU 100 detects a shift range currently selected in the transmission based on the information from the TCU 200 and calculates an engine speed Ne based on the output of the crank angle sensor.

If the non-driving range (the N range or the P range) is selected in the transmission and the engine speed is a preset threshold or smaller, the surging suppression control proceeds to Step S19 to prevent the generation of noise that would be caused by opening the air-bypass valve 24 in response to racing (an engine racing) with the vehicle staying in the standstill state, otherwise, the control proceeds to Step S20.

<Step S19: Air Bypass Valve Opening/Closing Request=Closing>

The ECU 100 sets the air-bypass valve opening/closing request to a "closing" request.

As a result, the air bypass valve 24 is brought into a closed state.

Thereafter, the surging suppression control proceeds to Step S20.

<Step S20: Updating of Air Bypass Valve Opening Time Counter>

With the air-bypass valve 24 staying in the opened state, the ECU 100 updates a counter value of the air-bypass valve opening time counter.

Thereafter, the series of processes ends (is returned).

<Step S21: Clearing of Air Bypass Valve Opening Time Counter>

With the air-bypass valve 24 staying in the closed state, the ECU 100 clears (resets) the counter value of the air-bypass valve opening time counter.

Thereafter, the series of processes ends (is returned).

In the first embodiment, to obtain the properties in which the acceleration is increased after the start of acceleration (the so-called turbo bang-like properties) when the vehicle is accelerated under predetermined conditions, the following boost pressure increase control is executed.

In the boost pressure increase control, the turbocharger 40 is pre-rotated with the air-bypass valve 24 brought into the opened state and the waste gate valve 44 brought into the closed state when a first condition, which will be described below, is satisfied. Then, when a second condition, which will be described below, is satisfied, an execution condition of the boost pressure increase control is determined to be established, and the air-bypass valve 24 is brought into the closed state and the waste gate valve 44 is brought into the closed state to thereby increase the boost pressure.

Figure 4:
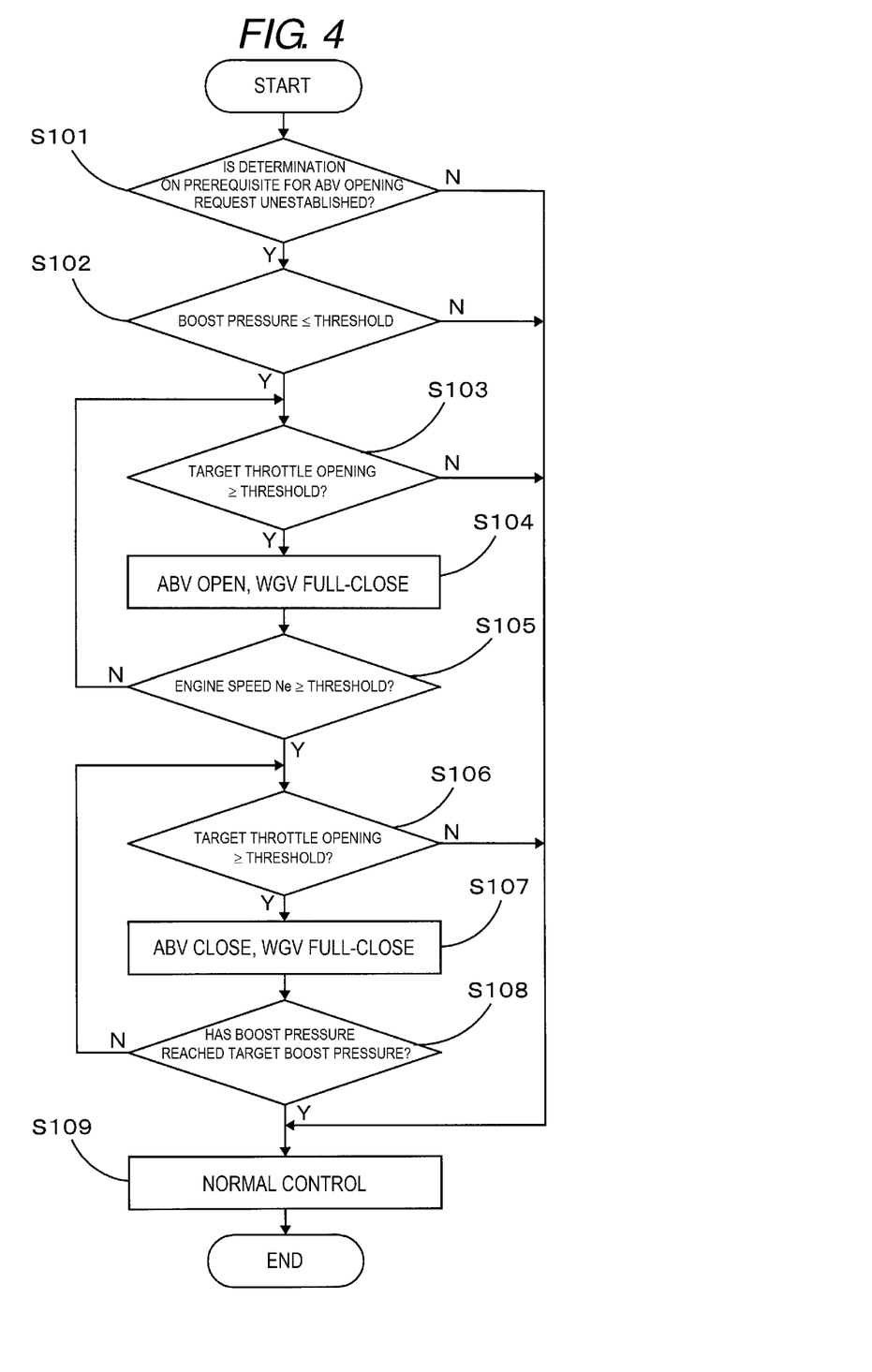
FIG. 4 is a flowchart illustrating a boost pressure increase control in the engine control device of the first embodiment.

FIG. 4 is a flowchart illustrating the boost pressure increase control in the engine control apparatus according to the first embodiment.

Hereinafter, the surging suppression control will be described sequentially step by step.

<Step S101: Determination on Prerequisite for Air Bypass Valve Opening Request>

The ECU 100 refers to the state of the determination on the prerequisite for a air-bypass valve opening request.

If the determination on the prerequisite for an air-bypass valve opening request is established, the boost pressure increase control proceeds to Step S109 to give priority to the surging counteracting control illustrated in FIGS. 2, 3.

If the determination on the prerequisite for an air-bypass valve opening request is unestablished, the boost pressure increase control proceeds to Step S102.

<Step S102: Determination on Boost Pressure>

The ECU 100 detects the current boost pressure of the turbocharger 40 based on the intake pipe pressure detected by the pressure sensor 26a.

If the present boost pressure is a preset threshold or smaller and there is still room for increasing the boost pressure (if the current boost pressure does not each a maximum boost pressure), the boost pressure increase control proceeds to Step S103, otherwise, the control proceeds to Step S109.

<Step S103: Determination 1 on Target Throttle Opening>

The ECU 100 compares the current target opening of the throttle valve 26 with a predetermined threshold to determine whether there exists a highly loaded state that requires the boost pressure increase control to be executed.

This threshold can be set, for example, to a full opening (100%).

The threshold value may be set to a predetermined intermediate opening (for example, on the order of 70 to 90%).

Additionally, in one configuration, the user such as the driver can set the throttle opening constituting the threshold as the he or she desires.

If the target opening of the throttle valve 26 is the threshold or greater (as an example, the full opening), the ECU 100 determines that the first condition for a request for starting a pre-rotation of the turbine 42 is satisfied, whereby the boost pressure increase control proceeds to Step S104, otherwise, the control proceeds to Step S109.

<Step S104: Opening of Air Bypass Valve and Full Closing of Waste Gate Valve>

The ECU 100 brings the air-bypass valve 24 into the opened state and the waste gate valve 44 into a fully closed state.

This starts a pre-rotation of the turbocharger 40.

Thereafter, the boost pressure increase control proceeds to Step S105.

<Step S105: Determination on Engine Speed>

The ECU 100 compares a revolution speed of the crankshaft 11 (an engine speed Ne (rpm)) that is calculated based on an output from the crank angle sensor with a preset threshold.

The threshold value can be set to an arbitrary engine speed at which it is preferable to improve the acceleration by increasing the boost pressure in order to tune the engine output characteristic.

For example, the threshold can be set to any engine speed between 3000 to 5000 rpm.

Additionally, the user such as the driver can also set the engine speed, constituting the threshold, to any value that he or she desires.

Understanding that the second condition for the boost pressure increase control is satisfied when the engine speed Ne reaches or exceeds the threshold or greater, the boost pressure increase control proceeds to Step S106, otherwise, the control returns to Step S103 to repeat the processes in and after Step S103.

<Step S106: Determination 2 on Target Throttle Opening>

The ECU 100 compares the current target opening of the throttle valve 26 with a predetermined threshold.

This threshold can be set equal to, for example, the threshold in Step S103.

If the target opening of the throttle valve 26 is the threshold or greater (full opening), the boost pressure increase control proceeds to Step S107 to increase the boost pressure, otherwise, understanding that the acceleration request is suppressed by the driver releasing the accelerator pedal, the control proceeds to Step S109.

<Step S107: Closing of Air Bypass Valve and Full Closing of Waste Gate Valve>

The ECU 100 brings both the air-bypass valve 24 and the waste gate valve 44 into the closed state (a fully closed state).

As a result, the intake air amount of the engine 1 is increased, and the flow rate of exhaust gas introduced into the turbine 42 is increased, whereby the rotation speed of the turbocharger 40 is increased to start increasing the boost pressure.

Thereafter, the boost pressure increase control proceeds to Step S108.

<Step S108: Determination on Boost Pressure>

The ECU 100 compares the current boost pressure (an intake pipe pressure on an upstream side of the throttle valve 26) of the turbocharger 40 with a preset target boost pressure (an upper limit boost pressure for acceleration).

If the current boost pressure (the actual boost pressure) coincides with the target boost pressure, the boost pressure increase control proceeds to Step S109 to prevent an excessive increase in boost pressure, otherwise, the control returns to Step S106 to repeat the processes in and after Step S106 to increase further the boost pressure.

<Step S109: Return to Normal Control>

The ECU 100 returns to the normal control that is executed when the boost pressure increase control is not executed.

In the case where the driver's request torque is in the NA region (the region where an actual torque corresponding to the driver's request torque can be generated without supercharging), the air-bypass valve 24 is brought into the closed state, while the waste gate valve 44 is brought into a fully opened state, whereby the output of the engine 1 is controlled mainly by the opening of the throttle valve 26.

On the other hand, in the case where the driver's requested torque is in the supercharging region where an actual torque corresponding to the driver's requested torque cannot be generated unless supercharging is executed, the air-bypass valve 24 is brought into the closed state, while a boost pressure feedback control is executed on the waste gate valve 44 so that an actual boost pressure coincides with the target boost pressure that corresponds to the driver's requested torque.

In the case where the air-bypass valve opening/closing request is now functioning as the air-bypass valve "opening" request by the surging suppression control illustrated in FIGS. 2, 3, the air-bypass valve 24 is brought into the opened state to give priority to the surging suppression control.

Thereafter, the series of processes ends (is returned).

Figure 5:
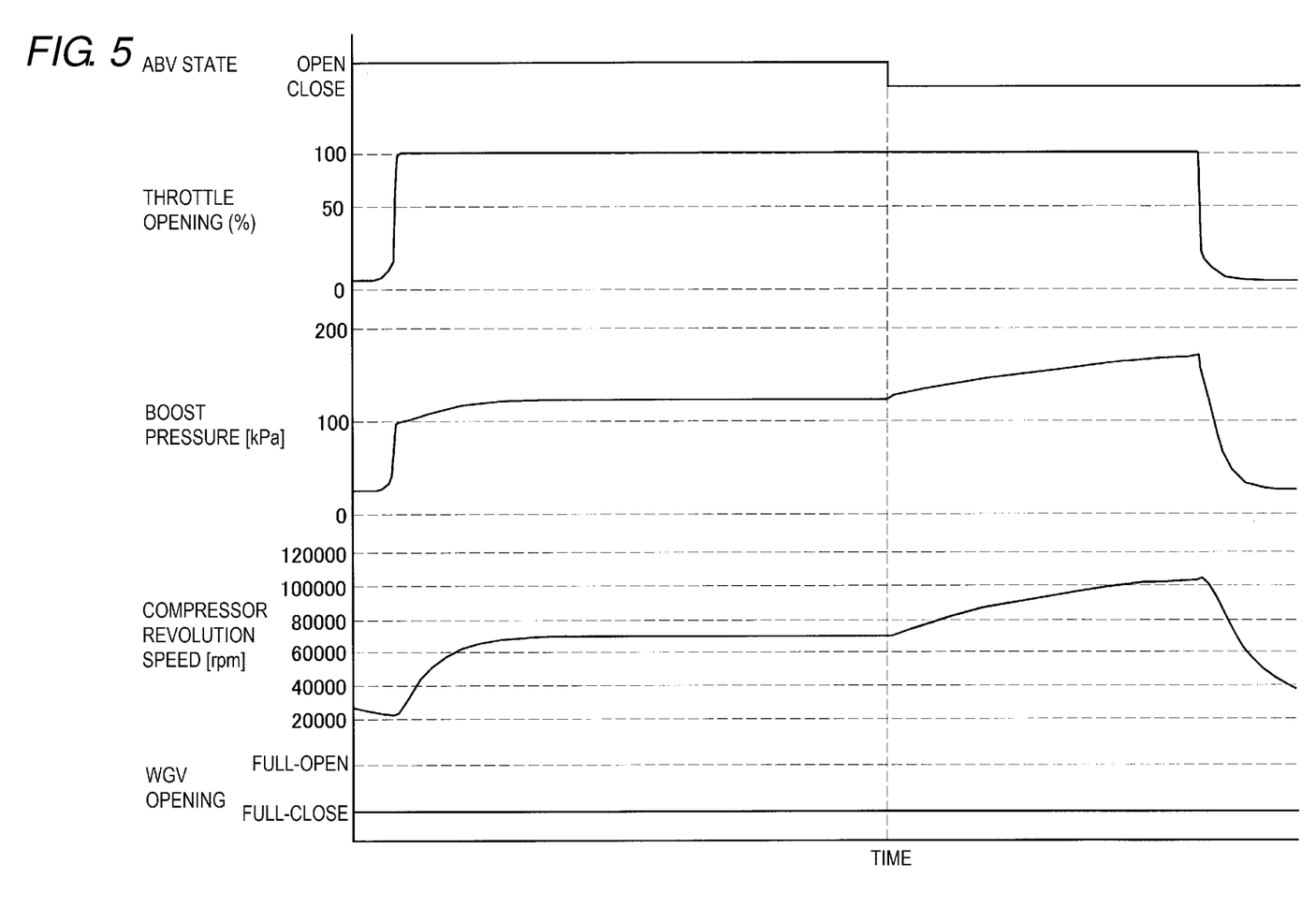
FIG. 5 is a chart illustrating examples of transitions of boost pressure, compressor rotation speed and the like of the engine controlled by the engine control device of the first embodiment.

FIG. 5 is a chart illustrating examples of transitions of boost pressure, compressor rotation speed and the like of the engine controlled by the engine control device of the first embodiment.

In FIG. 5, an axis of ordinate represents the opened/closed state of the air-bypass valve 24, opening (%) of the throttle valve 26, boost pressure (kPa), revolution speed (rpm) of the compressor 41, and opening of the waste gate valve 44.

As the boost pressure increase control starts, firstly, the air-bypass valve 24 is brought into the opened state, the throttle valve 26 is brought into the fully opened state, and the waste gate valve 44 is brought into the fully closed state. As a result, the entire amount of the exhaust gas discharged from the exhaust port is introduced into the turbine 42, and contributes to driving of the turbocharger 40, the whole amount of exhaust gas discharged from the exhaust ports is introduced into the turbine 42, which contributes to driving the turbocharger 40.

This starts a pre-rotation of the turbocharger 40, whereby the revolution speed of the compressor 41 is increased from about 20000 rpm to about 70000 rpm.

Normally, in the case where the state continues where the throttle valve 26 is fully opened and the waste gate valve 44 is fully closed, resulting in a concern that the boost pressure becomes excessive, damaging the hardware.

In this embodiment, however, the turbocharger 40 is pre-rotated while preventing the boost pressure becoming excessive by recirculating air from the downstream side to the upstream side of the compressor 41 by bringing the air-bypass valve 24 into the opened state.

At this occurs, the boost pressure converges on the order of 120 kPa.

Thereafter, air that has been recirculating before and after the compressor 41 until then is taken into the engine 1 as fresh air by bringing the air-bypass valve 24 into the closed state, contributing to generation of an output from the engine 1 as a result of being burned therein. This increases the flow rate of exhaust gas introduced into the turbine 42.

As a result, the revolution speed of the compressor 41 starts rising and eventually reaches, for example, about 100000 rpm.

The boost pressure also rises to, for example, about 170 kPa in response to the increase in revolution speed of the compressor 41.

As a result, the amount air taken into the engine 1 is increased further, increasing the output torque accordingly, as a result of which the vehicle is accelerated with the acceleration being increased.

Thus, as has been described heretofore, according to the first embodiment, the following advantageous effects can be obtained.

(1) When the target opening of the throttle valve 26 becomes the full opening, the waste gate valve 44 is brought into the closed state while holding the throttle valve 26 in the fully opened state, whereby the whole amount of exhaust gas is supplied to the turbine 42 for contribution to driving the compressor 41, thereby making it possible to start the pre-rotation of the turbocharger 40 to increase the revolution of the compressor 41.

In the case where with the throttle valve 26 normally fully opened, the waste gate valve 44 is held in the closed state, there is a concern that the boost pressure is increased excessively, damaging the hardware such as the main body unit (the main mechanical unit) 10 of the engine 1, the turbocharger 40, and the like; however, in the first embodiment of the disclosure, air is recirculated from the downstream side to the upstream side of the compressor 41 while holding the air-bypass valve 24 in the opened state, thereby making it possible to prevent an excessive increase in the boost pressure.

Thereafter, the air-bypass valve 24 is brought into the closed state when the engine speed Ne increases to the predetermined threshold, whereby the amount of air taken into the engine 1 is increased, and this rapidly increases the flow rate of exhaust gas, thereby increasing both the revolution speed of the compressor 41 and the boost pressure. As a result, the output torque of the engine 1 is improved to increase the acceleration of the vehicle, whereby the passenger can enjoy feeling a sensation of exhilarate sporty extended acceleration (an extended feeling of acceleration and a so-called turbo bang-like feeling), and the product value of the vehicle can be increased.

(2) Both the target opening and the actual opening of the throttle valve 26 are fully opened by the simple action of the driver depressing the accelerator pedal down to the full open state, and the pre-rotation of the turbocharger 40 is started, whereby the aforesaid advantageous effect can be obtained by the simple operation.

(3) When the engine speed Ne reaches or exceeds the predetermined threshold after the pre-rotation of the turbocharger 40 is started in the boost pressure increase control, the air-bypass valve 24 is brought into the closed state to increase the boost pressure, whereby the output properties and the acceleration feeling (the feeling of extended acceleration) that give the sporty impression can be obtained as the properties of increasing the boost pressure and the torque in association with the increase in engine speed Ne.

(4) In the case where the determination on the prerequisite for the air-bypass valve opening request, which is intended to suppress surging, is established, to give priority to surging suppression, the boost pressure increase control is not executed, whereby surging, likely to be generated, for example, when the throttle is closed rapidly, is suppressed to thereby prevent the generation of abnormal noise and the damage to the compressor.

Second Embodiment

Next, a second embodiment of an engine control device to which another aspect of the disclosure is applied will be described.

An engine that is controlled by engine control devices of embodiments that will be described below has, unless otherwise described, a hardware configuration common to that of the first embodiment, and in the following descriptions, like reference numerals will be given to like configurations to those of the first embodiment.

Figure 6:
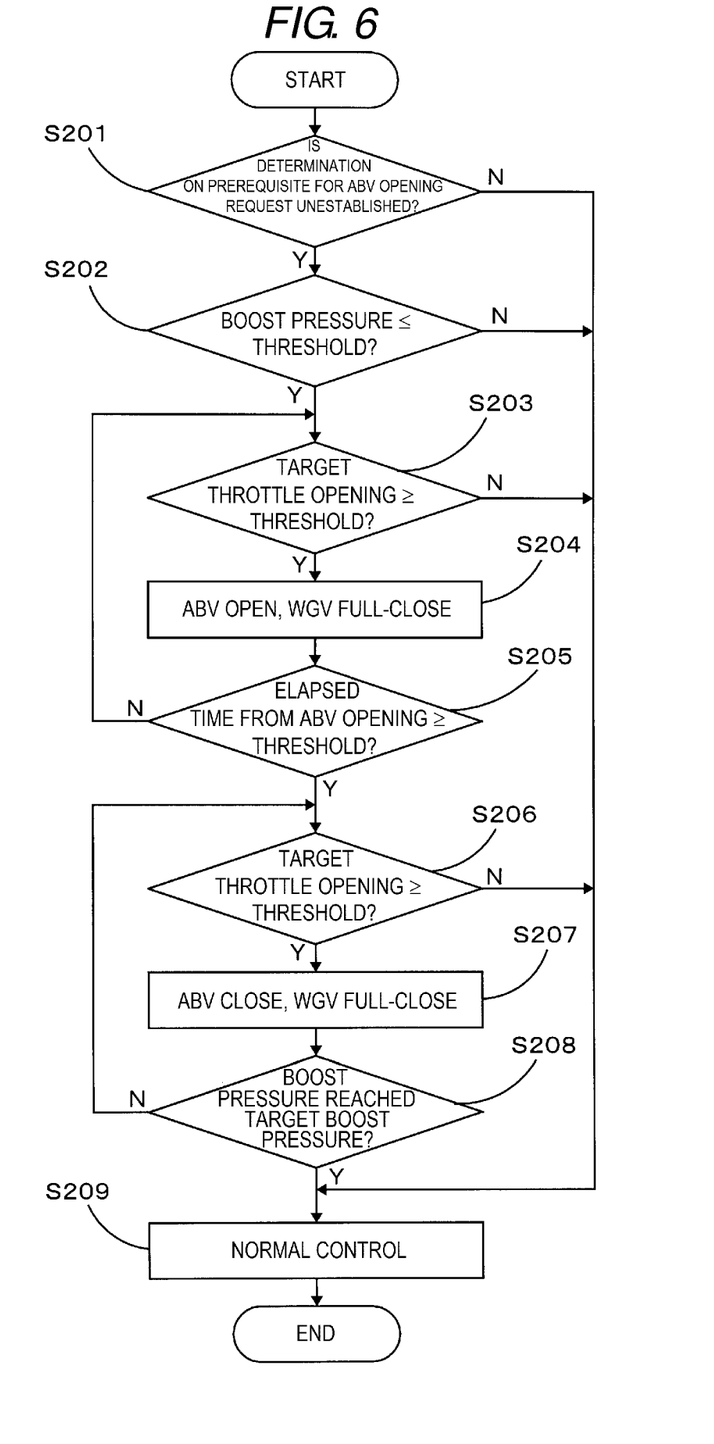
FIG. 6 is a flowchart illustrating a boost pressure increase control in a second embodiment of an engine control device to which the disclosure is applied.

In the engine control device of the second embodiment, in a boost pressure increase control, a determination on whether an engine speed Ne reaches or exceeds a threshold (whether a second condition is satisfied) after a target opening of a throttle valve 26 reaches or exceeds a threshold (a first condition is satisfied) is made based on a time that has elapsed since an air-bypass valve 24 is brought into an opened state.

FIG. 6 is a flowchart illustrating a boost pressure increase control in the engine control device of the second embodiment.

Hereinafter, the surging suppression control will be described sequentially step by step.

<Step S201: Determination on Prerequisite for Air Bypass Valve Opening Request>

The ECU 100 refers to the state of the determination on the prerequisite for a air-bypass valve opening request.

If the determination on the prerequisite for an air-bypass valve opening request is established, the boost pressure increase control proceeds to Step S209, otherwise, if the determination is unestablished, the control proceeds to Step S202.

<Step S202: Determination on Boost Pressure>

The ECU 100 detects the current boost pressure, and if the boost pressure is a preset threshold or smaller, the boost pressure increase control proceeds to Step S203, otherwise, the control proceeds to Step S209.

<Step S203: Determination 1 on Target Throttle Opening>

The ECU 100 compares the current target opening of the throttle valve 26 with a predetermined threshold, and if the target opening is the threshold or greater (for example, a full opening), determining that a first condition for starting a pre-rotation of a turbine 42 is satisfied, the boost pressure increase control proceeds to Step S204, otherwise, the control proceeds to Step S209.

<Step S204: Opening of Air Bypass Valve and Full Closing of Waste Gate Valve>

The ECU 100 brings the air-bypass valve 24 into an opened state and brings a waste gate valve 44 into a fully closed state.

Thereafter, the boost pressure increase control proceeds to Step S205.

<Step S205: Determination on Elapsing Time Since Opening of Air Bypass Valve>

The ECU 100 compares a time that has elapsed since the air-bypass valve 24 is brought into the opened state with a preset threshold.

The threshold value may be set by a user such as a driver as he or she desires.

If the time that has elapsed since the air-bypass valve 24 is brought into the opened state reaches or exceeds the threshold, determining that a second state for a boost pressure increase request is satisfied, the boost pressure increase control proceeds to Step S206, otherwise, the control returns to Step S203 to repeat the processes in and after Step S203.

<Step S206: Determination 2 of Target Throttle Opening>

The ECU 100 compares the current target opening of the throttle valve 26 with a predetermined threshold.

If the target opening of throttle valve 26 is the threshold or greater (for example, a full opening), the boost pressure increase control proceeds to Step S207, otherwise, the control proceeds to Step S209.

<Step S207: Closing of Air Bypass Valve and Full Closing of Waste Gate Valve>

The ECU 100 brings both the air-bypass valve 24 and the waste gate valve 44 into the closed state (a fully closed state).

Thereafter, the boost pressure increase control proceeds to Step S208.

<Step S208: Determination on Boost Pressure>

The ECU 100 compares the current boost pressure with a preset target boost pressure.

If the current boost pressure (the actual boost pressure) reaches the target boost pressure, the boost pressure increase control proceeds to Step S209, otherwise, the control returns to Step S206 to repeat the processes in and after Step S206.

<Step S209: Return to Normal Control>

The ECU 100 returns to the normal control.

Thereafter, the series of processes ends (is returned).

In the second embodiment that has been described heretofore, too, a similar advantageous effect to that provided by the first embodiment can be obtained.

the output properties and the acceleration feeling (the feeling of extended acceleration) that give the sporty impression can be obtained by imparting an appropriate response time delay to the rising properties of boost pressure and output torque.

Third Embodiment

Next, a third embodiment of an engine control device to which a further aspect of the disclosure is applied will be described.

In the third embodiment, a pre-rotation starting request for a turbocharger 40 (satisfying a first condition) in a boost pressure increase control and a boost pressure increase request (satisfying a second condition) are made individually in response to corresponding operations by a driver.

In the third embodiment, a turbocharger pre-rotation starting switch and a boost pressure increase starting switch, which are not illustrated, are provided at a location where the driver can operate the switches in a passenger compartment of a vehicle.

These switches can be provided on, for example, a steering wheel by which the driver steers the vehicle, a gear shift lever by which the drive switches the positions of the transmission, an instrument panel, and the like.

Although these switches are provided separately, for example, one single switch may be provided for use in such a way that when the switch is operated for the first time, the switch functions as the turbocharger pre-rotation starting switch, while when the switch is operated for the second time, the switch functions as the boost pressure increase starting switch.

Figure 7:
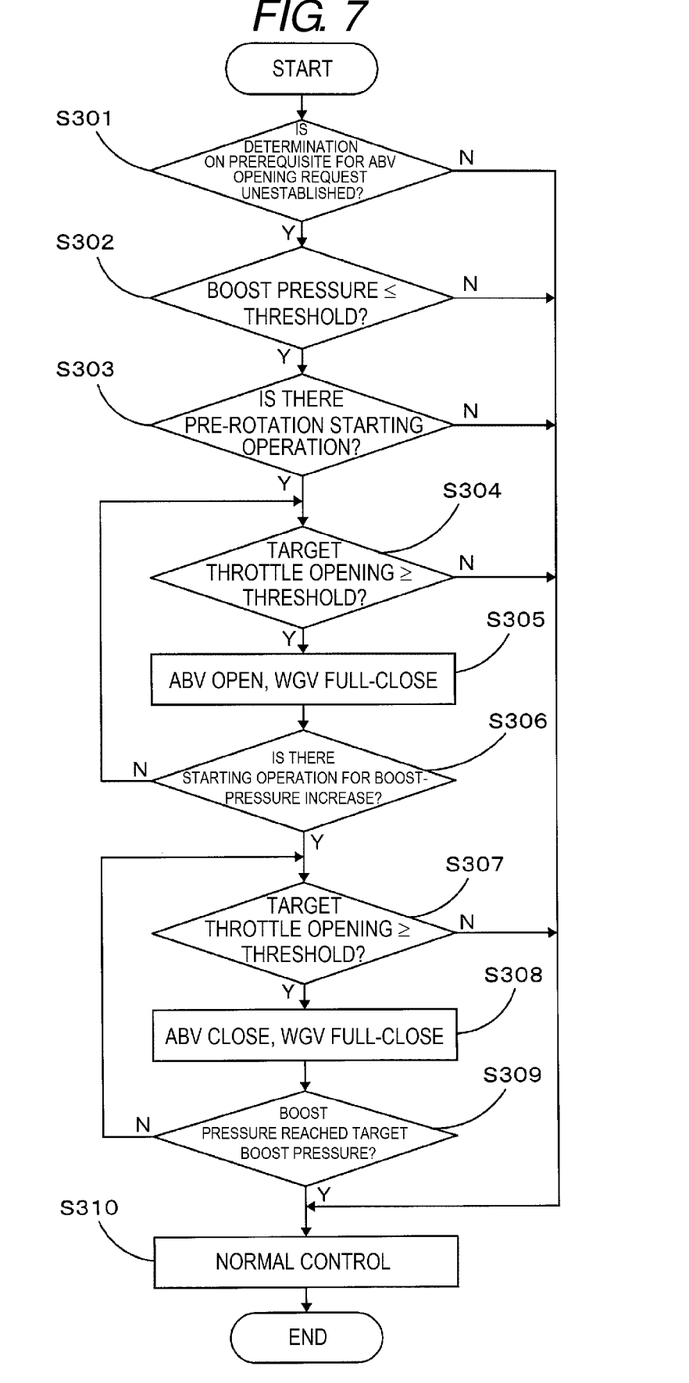
FIG. 7 is a flowchart illustrating a boost pressure increase control in a third embodiment of an engine control device to which the disclosure is applied.

FIG. 7 is a flowchart illustrating a boost pressure increase control in the engine control device of the third embodiment.

Hereinafter, the surging suppression control will be described sequentially step by step.

<Step S301: Determination on Prerequisite for Air Bypass Valve Opening Request>

The ECU 100 refers to the state of the determination on the prerequisite for a air-bypass valve opening request.

If the determination on the prerequisite for an air-bypass valve opening request is established, the boost pressure increase control proceeds to Step S310, otherwise, if the determination is unestablished, the control proceeds to Step S302.

<Step S302: Determination on Boost Pressure>

The ECU 100 detects the current boost pressure, and if the boost pressure is a preset threshold or smaller, the boost pressure increase control proceeds to Step S303, otherwise, the control proceeds to Step S310.

<Step S303: Determination on Turbocharger Pre-Rotation Starting-Operation>

The ECU 100 determines whether an input operation (a satisfying operation of the first condition) has been performed on the turbocharger pre-rotation starting switch by the driver.

If an input has been made into the turbocharger pre-rotation starting switch, determining that the driver desires a start of pre-rotation of a turbocharger 40 in the boost pressure increase control, the boost pressure increase control proceeds to Step S305, otherwise, the control proceeds to Step S310.

<Step S304: Determination 1 on Target Throttle Opening>

The ECU 100 compares the current target opening of a throttle valve 26 with a predetermined threshold, and if the target opening is the threshold or greater (for example, a full opening), determining that the first condition for the pre-rotation starting request for the turbine 42 is satisfied, the boost pressure increase control proceeds to Step S305, otherwise, the control proceeds to Step S310.

<Step S305: Opening of Air Bypass Valve and Full Closing of Waste Gate Valve>

The ECU 100 brings the air-bypass valve 24 into an opened state and brings a waste gate valve 44 into a fully closed state.

Thereafter, the boost pressure increase control proceeds to Step S306.

<Step S306: Determination on Boost Pressure Increase Starting Operation>

The ECU 100 determines whether an input operation (a satisfying operation of the second condition) has been performed on the boost pressure increase starting switch by the driver.

If an input has been made into the boost pressure increase starting switch, determining that the driver requests a start of boost pressure increased in the boost pressure increase control (determining that the second condition is satisfied), the boost pressure increase control proceeds to Step S307, otherwise, the control returns to Step S304 to repeat the processes in and after Step S304.

<Step S307: Determination 2 on Target Throttle Opening>

The ECU 100 compares the current target opening of the throttle valve 26 with a predetermined threshold.

If the target opening of the throttle valve 26 is the threshold or greater (for example, a full opening), the boost pressure increase control proceeds to Step S308, otherwise, the control proceeds to Step S310.

<Step S308: Closing of Air Bypass Valve and Full Closing of Waste Gate Valve>

The ECU 100 brings both the air-bypass valve 24 and the waste gate valve 44 into the closed state (a fully closed state).

Thereafter, the boost pressure increase control proceeds to Step S309.

<Step S309: Determination on Boost Pressure>

The ECU 100 compares the current boost pressure with a preset target boost pressure.

If the current boost pressure (the actual boost pressure) coincides with the target boost pressure, the boost pressure increase control proceeds to Step S310, otherwise, the control returns to Step S307 to repeat the processes in and after Step S307.

<Step S310: Return to Normal Control>

The ECU 100 returns to the normal control.

Thereafter, the series of processes ends (is returned).

According to the third embodiment that has been described heretofore, the following advantageous effects can be obtained in addition to a similar advantageous effect to that of the first embodiment.

(1) The pre-rotation of the turbocharger 40 can be started as soon as the driver desires to start it by starting the pre-rotation of the turbocharger 40 in response to the starting operation performed by the driver in the boost pressure increase control, thereby making it possible to improve the convenience and the controllability.

For example, when the vehicle is accelerated on a low μ road such as a wet road surface, an unpaved road surface, a road covered with ice or snow, or the like, or when the vehicle is accelerated rapidly as in a sporty driving like racing, with a state where drive wheels tend to easily spin (as immediately after starting), the turbocharger 40 can be pre-rotated without increasing the boost pressure and the output torque excessively, whereby the drivability and the safety of the vehicle can be improved.

(2) By shifting the air-bypass valve 24 from the opened state to the closed state in response to a shifting operation performed by the driver (by increasing the boost pressure), the boost pressure, the output torque and the acceleration can be increased faithfully as the driver desires, thereby making it possible to improve the controllability and the drivability of the vehicle.

(Modifications)

The disclosure is not limited to the embodiments described above and hence can be modified or altered variously without departing from the spirit and scope of the disclosure, and the resulting embodiments are also included within the technical scope of the disclosure.

(1) The configurations of the engine and the engine control device are not limited to the embodiments described above and hence can be altered as required.

For example, the number of cylinders of the engine, the cylinder layout, the fuel injection system, the valve drive system, the configurations of the intake and exhaust systems and the auxiliaries, and the like can be altered as required.

(2) In the individual embodiments, although the throttle valve, which is the butterfly valve, is used as the throttle, other types of throttle valves such as a slide valve or the like, for example, may be used.

In addition, a so-called valve throttle may be used, the valve throttle being configured to control the intake air amount by making the valve opening period of the intake valve and the valve lift variable.

(3) The conditions for execution of the boost pressure increase control are not limited to those described in the individual embodiments and hence can be altered as required.

(4) In the third embodiment, although both the pre-rotation of the turbocharger and the increase in boost pressure are started in response to the operation and input by the driver (both the first and second conditions referred to in the disclosure are satisfied in response to the operation by the driver), only either of the two events may be executed in response to the operation and input by the driver, and the other of the events may be executed based on another condition.

As has been described heretofore, according to the aspects of the disclosure, an engine control device can be provided which can obtain properties in which acceleration is increased after starting to accelerate a vehicle.

The invention claimed is:

1. An engine control device for controlling an engine, the control device comprising:
    a controller configured to open an air bypass valve of the engine and close a waste gate valve of the engine when a first condition is satisfied, and thereafter determine that an execution condition of a boost pressure increase control is satisfied when a second condition is satisfied,
    wherein the engine includes:
    a turbocharger comprising a turbine configured to be driven by exhaust gas and a compressor configured to be driven by the turbine to compress fresh air;
    an air-bypass passage communicating between an upstream side and a downstream side of the compressor in an intake passage;
    an air-bypass valve disposed on the air-bypass passage;
    a waste gate passage communicating between an upstream side and a downstream side of the turbine in an exhaust passage;
    a waste gate valve disposed on the waste gate passage; and
    a throttle disposed downstream of the compressor in the intake passage,
    wherein the first condition represents a pre-rotation start request for the turbocharger, and the second condition represents a boost pressure increase request, and
    wherein said controller is configured to control the air bypass valve to be closed when the opening of the throttle is equal to or greater than a preset threshold value.

2. The engine control device according to claim 1, wherein when an opening of the throttle is the preset threshold value or greater, the first condition is determined to be satisfied.

3. The engine control device according to claim 2, wherein when a revolution speed of an output shaft of the engine is a predetermined threshold or greater after the first condition is satisfied, the second condition is determined to be satisfied.

4. The engine control device according to claim 2, wherein the second condition is determined to be satisfied after a predetermined period of time elapses after the first condition is satisfied.

5. The engine control device according to claim 2, wherein when the driver performs an operation to satisfy the second condition, the second condition is determined to be satisfied.

6. The engine control device according to claim 2, wherein, in the boost pressure increase control, when the opening of the throttle is the preset threshold value or greater after the second condition is satisfied, the air-bypass valve is brought into a closed state and the waste gate valve is in the closed state.

7. The engine control device according to claim 2, wherein with a driving state where surging with a predetermined amplitude or greater can be generated inside the intake passage, the boost pressure increase control is prohibited and the air-bypass valve is brought into an opened state.

8. The engine control device according to claim 1, wherein when a driver performs an operation to satisfy the first condition, the first condition is determined to be satisfied.

9. The engine control device according to claim 8, wherein when a revolution speed of an output shaft of the engine is a predetermined threshold or greater after the first condition is satisfied, the second condition is determined to be satisfied.

10. The engine control device according to claim 8, wherein the second condition is determined to be satisfied after a predetermined period of time elapses after the first condition is satisfied.

11. The engine control device according to claim 8, wherein when the driver performs an operation to satisfy the second condition, the second condition is determined to be satisfied.

12. The engine control device according to claim 8, wherein, in the boost pressure increase control, when the opening of the throttle is the preset threshold value or greater after the second condition is satisfied, the air-bypass valve is brought into a closed state and the waste gate valve is in the closed state.

13. The engine control device according to claim 8, wherein with a driving state where surging with a predetermined amplitude or greater can be generated inside the intake passage, the boost pressure increase control is prohibited and the air-bypass valve is brought into an opened state.

14. The engine control device according to claim 1, wherein when a revolution speed of an output shaft of the engine is a predetermined threshold or greater after the first condition is satisfied, the second condition is determined to be satisfied.

15. The engine control device according to claim 1, wherein the second condition is determined to be satisfied after a predetermined period of time elapses after the first condition is satisfied.

16. The engine control device according to claim 1, wherein when the driver performs an operation to satisfy the second condition, the second condition is determined to be satisfied.

17. The engine control device according to claim 1, wherein, in the boost pressure increase control, when the opening of the throttle is the preset threshold value or greater after the second condition is satisfied, the air-bypass valve is brought into a closed state and the waste gate valve is in the closed state.

18. The engine control device according to claim 1, wherein with a driving state where surging with a predetermined amplitude or greater can be generated inside the intake passage, the boost pressure increase control is prohibited and the air-bypass valve is brought into an opened state.

19. An engine control device for controlling an engine, the control device comprising:
   circuitry configured to open an air bypass valve of the engine and close a waste gate valve of the engine when a first condition is satisfied, and thereafter determine that an execution condition of a boost pressure increase control is satisfied when a second condition is satisfied,
   wherein the engine includes:
   a turbocharger comprising a turbine configured to be driven by exhaust gas and a compressor configured to be driven by the turbine to compress fresh air;
   an air-bypass passage communicating between an upstream side and a downstream side of the compressor in an intake passage;
   an air-bypass valve disposed on the air-bypass passage;
   a waste gate passage communicating between an upstream side and a downstream side of the turbine in an exhaust passage;
   a waste gate valve disposed on the waste gate passage; and
   a throttle disposed downstream of the compressor in the intake passage,
   wherein the first condition represents a pre-rotation start request for the turbocharger, and the second condition represents a boost pressure increase request,
   wherein said circuitry is configured to control the air bypass valve to be closed when the opening of the throttle is equal to or greater than a predetermined threshold value.

20. An engine control device controlling an engine, wherein the engine includes:
   a turbocharger comprising a turbine configured to be driven by exhaust gas and a compressor configured to be driven by the turbine to compress air;
   an air-bypass passage communicating between an upstream side and a downstream side of the compressor in an intake passage;
   an air-bypass valve disposed on an air-bypass passage that is communicating between an upstream side and a downstream side of the compressor in the intake passage;
   a waste gate valve disposed on a waste gate passage that is communicating between an upstream side and a downstream side of the turbine in an exhaust passage; and
   a throttle disposed downstream of the compressor in the intake passage, the engine control device comprises:
   a controller configured to open the air bypass valve of the engine and close the waste gate valve of the engine when a first condition is satisfied, and thereafter determine that an execution condition of a boost pressure increase control is satisfied when a second condition is satisfied, the first condition represents a pre-rotation start request for the turbocharger, and the second condition represents a boost pressure increase request,
   wherein after the second condition is satisfied, said controller is configured to control the air bypass valve to be closed and the waste gate valve to be closed when the opening of the throttle is equal to or greater than a predetermined threshold value.

* * * * *